US012567749B2

(12) United States Patent　　　　　(10) Patent No.: US 12,567,749 B2
Bartel et al.　　　　　　　　　　　　　(45) Date of Patent: Mar. 3, 2026

(54) METHOD FOR CONTROLLING ELECTRICAL NETWORK VARIABLES IN A FEED NETWORK

(71) Applicant: Fronius International GmbH, Pettenbach (AT)

(72) Inventors: Daniel Bartel, Wels-Thalheim (AT); Richard Grasböck, Wels-Thalheim (AT); Harald Kreuzer, Wels-Thalheim (AT); Roland Pieler, Wels-Thalheim (AT)

(73) Assignee: Fronius International GmbH, Pettenbach (AT)

( * ) Notice: Subject to any disclaimer, the term of this patent is extended or adjusted under 35 U.S.C. 154(b) by 34 days.

(21) Appl. No.: 18/578,940

(22) PCT Filed: Jul. 12, 2022

(86) PCT No.: PCT/EP2022/069418
§ 371 (c)(1),
(2) Date: Jan. 12, 2024

(87) PCT Pub. No.: WO2023/285439
PCT Pub. Date: Jan. 19, 2023

(65) Prior Publication Data
US 2024/0322573 A1　　Sep. 26, 2024

(30) Foreign Application Priority Data
Jul. 14, 2021　(EP) ..................................... 21185638

(51) Int. Cl.
*H02J 3/46*　　　　　(2006.01)
(52) U.S. Cl.
CPC ..................................... *H02J 3/46* (2013.01)

(58) Field of Classification Search
CPC ......................................................... H02J 3/46
(Continued)

(56) References Cited

U.S. PATENT DOCUMENTS 10,557,457 B2　2/2020　Drossel et al.
10,738,763 B2　8/2020　Bode et al.
(Continued)

FOREIGN PATENT DOCUMENTS

DE　10 2014 200 412　7/2015
DE　10 2018 124 124　10/2019
(Continued)

OTHER PUBLICATIONS

Europe Search Report/Office Action conducted in counterpart Europe Appln. No. 21185638.0 (Dec. 9, 2021).
(Continued)

*Primary Examiner* — Hal Kaplan
(74) *Attorney, Agent, or Firm* — GREENBLUM & BERNSTEIN, P.L.C.

(57) ABSTRACT
A method which is improved relative to the prior art for controlling electrical network variables in a feed network, in which the correlation between at least one feed variable measured at an input of the feed network and at least one network variable measured at an output of the feed network is described in a model-like manner using a model of the feed network. In the event of an incorrect description of the correlation, an adaptation of the model of the feed network is carried out, a feed variable target value for the at least one feed variable is determined from a predefined network variable target value for the at least one network variable using the model of the feed network, and the at least one feed variable is set to the determined feed variable target value by of a current converter.

12 Claims, 3 Drawing Sheets

Figure 1:
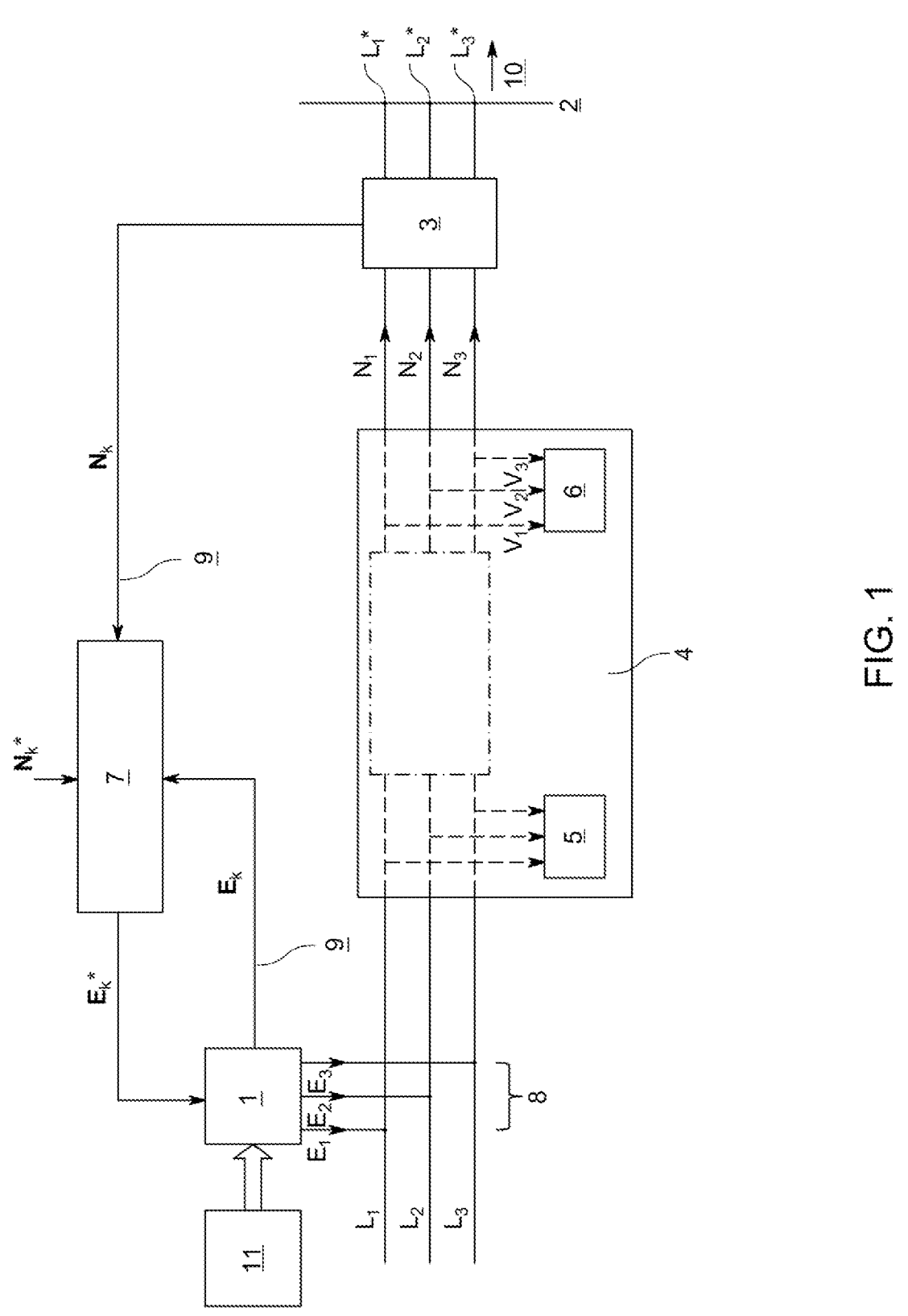

(58) Field of Classification Search
USPC .......................................................... 307/24
See application file for complete search history.

(56)                    References Cited

U.S. PATENT DOCUMENTS

| | | |
|---|---|---|
| 2018/0258914 A1 | 9/2018 | Drossel et al. |
| 2019/0010926 A1 | 1/2019 | Bode et al. |
| 2021/0215774 A1 | 7/2021 | Buenemann et al. |
| 2021/0285420 A1 | 9/2021 | Schwanka Trevisan et al. |

FOREIGN PATENT DOCUMENTS

| | | |
|---|---|---|
| DE | 10 2018 116 444 | 1/2020 |
| DE | 10 2018 129 810 | 5/2020 |
| EP | 3 376 026 | 9/2018 |
| EP | 3 429 050 | 1/2019 |

OTHER PUBLICATIONS

Int'l Search Report (Form PCT/ISA/210) conducted in Int'l Appln. No. PCT/EP2022/069418 (Nov. 7, 2022).
Int'l Written Opinion (Form PCT/ISA/237) conducted in Int'l Appln. No. PCT/EP2022/069418 (Nov. 7, 2022).

METHOD FOR CONTROLLING ELECTRICAL NETWORK VARIABLES IN A FEED NETWORK

The present invention pertains to a method for controlling electrical network variables at a network connection point at an output of a feed network which is connected to at least one power converter at an input of the feed network, wherein at least one feed variable and at least one network variable are measured at the power converter connection point, and wherein the correlation between the at least one feed variable and the at least one network variable is described in a model-like manner using a model of the feed network, wherein the model of the feed network is implemented in a control unit of the feed network.

The continuous increase in decentrally generated energy in the energy mix of current energy supply systems leads to a wide variety of new tasks in the fields of network regulation and feed management. In particular, the volatility of renewable energy carriers confronts the operators of decentralized energy generating systems in many cases, on the one hand, with production and associated offer peaks, on the other hand with production and associated offer valleys. In addition to the damping of supply peaks and/or valleys, economic considerations in the planning of operating and/or feed strategies for decentralized energy generating systems are also increasingly coming into focus. Thus, feeding is often only performed in the event of satisfactory electricity prices or the amount of energy delivered is adapted to the development of electricity prices.

For closer consideration of this topic, a definition of the terms "feed network" and "distribution network" is initially carried out. In the present context, a feed network is understood to mean the electrotechnical operating means given at the location of a decentralized energy generating system, such as conductors, cables or phase inverters, which connect the electrical devices required for operating the decentralized energy generating system to one another. By contrast, a distribution network is understood to mean a power supply system usually provided by a network operator, in the sectors of high, medium and low voltage, which often comprises lines with a cumulative length of several hundred kilometers and usually connects a plurality of energy generating systems to a plurality of consumers.

A first problem arises often from the fact that the properties of electrical power variables, such as electrical current, electrical voltage or electrical power, which are output during a feed to a distribution network, are usually not entirely at the discretion of a power plant operator. Among other things, voltage and/or frequency range of fed power variables are in many cases strictly regulated. In addition, distribution network operators are increasingly demanding mechanisms for limiting the feed due to possible generation peaks, which mechanisms are to be provided, for example, for operation of photovoltaic systems (PV systems). In addition to a limitation of the amount of energy fed in, the feeding or absorption of a specific amount of energy can also be required. In this respect, the so-called zero feed, with which no energy can be output to a distribution system in phase-resolved manner, is particularly noteworthy.

In order to implement such requirements within the scope of an operating and/or feed strategy for a decentralized energy generating system, it is usually necessary to take into account with sufficient accuracy in particular the topology of a local feed network given at a connection point. Furthermore, in addition to a decentralized energy generating system, local consumers of households or buildings at the connection site are often also connected to a local feed network. Depending on the application, local consumers can be provided by electrical appliances, such as microwaves, washing machines and refrigerators, or also by devices with high energy requirements, such as machine tools or manufacturing lines. In the planning of a suitable operating and/or feed strategy, it can be advantageous in such cases, in addition to network topology, to take into account the local consumers, in particular if substantial parts of the locally generated energy can be consumed directly by local consumers. In order to consider both the topology of a local feed network given at the connection point, and local consumers, typically (mathematical) models of network topology and/or (local) consumers are used.

In addition to taking into account network topology and local consumers, in the development of operating and/or feed strategies for decentralized energy generating systems, their adaptability to changes in a feed network often plays a substantial role. Thus, the network topology at the connection point can partially change by a modification of the wiring, for example in the course of maintenance and/or conversion work. In the case of new operations, it is furthermore often advantageous to be able to quickly and easily identify a new and thus usually unknown feed network. Furthermore, local consumers that are connected and/or disconnected can lead to deviations from a nominal situation assumed during the planning of an operating and/or feed strategy during operation, whereupon a suitable adaptation can also be necessary.

The present invention relates in particular to these problems, wherein the focus is directed on feed networks, to which at least one power converter and at least one measuring device are connected. In addition, one or more local consumers can optionally also be connected. The power converter can thereby be provided by an inverter which, initially changes electrical power variables generated as DC variables from an energy generating system, such as a PV system, a battery storage or a fuel cell, in order to supply these to the feed network, which is usually provided as an AC network. In this context, converters are also conceivable as a possible implementation form of a power converter, for example in order to adapt the frequency of a power variable already present as an alternating variable precisely to the requirements of a network operator. In the present context, a local consumer can already consume at least a portion of the supplied energy at the generation site, and the at least one measuring device usually makes it possible to detect and measure the power variables ultimately output to a distribution system. Within the scope of the present designs, further electrical equipment, such as transformers, converters, or also phase inverters, can be provided between the power converter and the measuring device. A basic change of the feed network, as a result of which an adaptation of an operating and/or feed strategy can be required, can thereby be brought about by different processes, a change in the transformer transmission ratio or a reversal of a phase inverter are only examples of this.

The need to match operating and/or feed strategies for the operation of decentralized power supply plants to a given feed network is known in the prior art. Since such operating and/or feed strategies usually are based on a model-like and usually mathematical description of a feed network, a plurality of documents are found in the prior art, which documents are concerned with the identification of models for describing feed networks.

In this context, DE 102014200412 A1 discloses a method for identifying a model in the form of an assignment of the phases at the connection point of a power converter with the phases at the connection point of an electrical distribution network referred to as the network transfer point. How this identification takes place in detail is not disclosed in DE102014200412 A1. It is only generally described that a pilot signal in the form of a test current can actively be impressed into the electrical network for this purpose.

DE 102018124124 B3 also discloses a method for identifying the assignment of the phases at the connection point of an unbalanced load-capable device, which can represent a power converter, with the phases at the connection point of a detection device. For identification, an unbalanced load profile is actively impressed by the unbalanced load-capable device, which is compared with measurements detected by the detection unit. A phase assignment is subsequently derived from this comparison.

A first disadvantage of the cited documents is that, for identification of a model, pilot or test signals always have to be actively introduced into the electrical network to be identified. This prerequisite can significantly limit the practical applicability of feed strategies that are based on such approaches, since normal operation can be severely disturbed by the active feeding of test signals. Apart from this, the feeding also causes additional circuit complexity. A second disadvantage of the cited publications is given by the fact that unknown consumers, and thus in particular also temporarily connected or disconnected consumers, and their effect on the behavior of an electrical network to be identified are not included in the identification and thus also not in operating and/or feed strategies that are based thereon. A further disadvantage of the approaches known from the prior art results from a lack of adaptability of the concepts presented. In this case, decisive questions relate to when and how a given model of a feed network is to be adapted, to ensure a high operating quality even in the event of changes of a feed network, in particular during operation. These questions remain unanswered in the prior art. Furthermore, it is not apparent from the prior art how a model of a feed network, which may also be adapted multiple times, is to be advantageously integrated into an operating strategy.

It is therefore the object of the present invention to improve the operating behavior of a feed network to which at least one power converter, at least one measuring device and optionally one or more consumers are connected.

According to the invention, this object is achieved by the features of the independent claims, wherein two method steps for the generation of target values and the control of power variables prevailing in a feed network and an adaptation of a model of the feed network which is optionally carried out multiple times are used.

Specifically, within the scope of the present invention, a feed network is assumed which is connected to at least one power converter at an input of the feed network at a power converter connection point, wherein at least one feed variable is measured at the power converter connection point and at least one network variable is measured at an output of the feed network. The network connection point here represents, on the one hand, a connection point for a measuring device for measuring network variables and, on the other hand, a connection point for a distribution network. However, it is preferable to measure not just one, but one feed variable per phase at the power converter connection point. The same applies to the measurement of network variables at the network connection point by a measuring device connected for this purpose. Specifically, electrical power variables such as electrical current, electrical voltage or electrical power, which prevail at different points of the feed network corresponding to their designation, are understood to be the feed variable and the network variable. The substantial and central element of the present invention is a model of the feed network, by means of which the feed network and thus the correlation or the relationship between the feed variables prevailing at the connection point of the power converter and the network variables prevailing at the connection point of the measuring device are described in a model-like manner. According to the invention, the model of the feed network is implemented in a control unit of the feed network.

A mathematical model which can be provided, for example, by an algebraic mapping or a differential equation system is preferably used as the model of the feed network. However, in order to implement the method according to the invention, non-mathematical models, such as a table which describes a phase assignment at different points of the feed network, can also be used. A particular advantage of the model-like description according to the invention is that the models used according to the invention are designed in such a way that the consideration of optional and moreover usually unknown consumers is possible as part of the model without additional effort.

According to the invention, in a method step for the generation of target values by means of the mentioned model of the feed network, target values for the feed variables to be set by the at least one power converter, hereinafter also "feed variable target values," are determined in the control unit from predefined target values for the network variables, hereinafter also "network variable target values." Since, as control variables for controlling or adjusting power variables, within the scope of the present invention, predeterminable electrical variables are used by the power converter, such as, for example, electrical currents that can be injected at its connections by the power converter, this transformation of target values in particular simplifies the system dynamics between manipulated variables and control variables. Since the determination of the feed variable target values is preferably carried out during operation of the feed network, in the event of an adaptation of the model, it is already clarified on the basis of this method step how a model, which may also be adapted during operation, can advantageously be integrated into an operating strategy of a feed network.

In a further method step for controlling, the given feed variables are set or controlled by means of the power converter to the determined feed variable target values, which, when the feed variable target values are correctly determined from the network variable target values, leads to the network variables being tracked to the network variable target values specified for them. A correct determination of the feed variable target values is thereby ensured if the model of the feed network describes the real feed network correctly and accurately. A correct and accurate description of the real feed network here means in particular a correct and accurate description of the correlation of network variables and feed variables.

In order to ensure a correct and accurate description of the feed network by the used model of the feed network even in the event of changes in the feed network, it is provided according to the invention to adapt the model of the feed network or to identify the model of the feed network completely again, if necessary, in the event of a deviation between measured network variables and the network variables to be expected based on the model of the feed network and/or in the event of a deviation between the measured feed variables and the feed variables to be expected based on the model of the feed network, wherein at least a portion of the detected measurement data of the feed variables and at least a portion of the detected measurement data of the network variables are used for adaptation or new identification of the model of the feed network. According to the invention, this adaptation is carried out in the control unit.

In the event of recurring changes in the feed network, an adaptation or a new identification of the model of the feed network is optionally also carried out several times. It is decisive here that the method according to the invention does not require test or pilot signals for identification. On the contrary, the method according to the invention recognizes when and whether an adaptation or new identification of the model of the feed network is to be carried out.

In a preferred embodiment of the method according to the invention, a deviation between measured network variables and network variables to be expected on the basis of the model of the feed network and thus an erroneous description of the correlation between the feed variables prevailing at the connection point of the power converter and the network variables prevailing at the connection point of the measuring device is detected, and an adaptation of the model of the feed network is carried out if the deviation between at least one measured value of a network variable and an estimated value of the corresponding network variable calculated by means of the model of the feed network exceeds a predefined threshold value. Analogously, the procedure can be carried out in a comparison of measured feed variables with estimated values of the feed variables calculated by the model of the feed network. Likewise, the deviation between two measured values from two different points in time of at least one network variable or at least one feed variable can be compared with a predefined threshold value, and an adaptation of the model of the feed network can be carried out if the deviation between the compared values exceeds a predefined threshold value.

In a preferred embodiment of the method according to the invention, a relative value of a measured value used to determine the deviation of at least one network variable is used as a threshold value for detecting a defective description of the correlation, wherein, for example, 10% or 50% or 100% can be used as a relative value.

In a further preferred embodiment of the method according to the invention, an absolute value of a measured value used to determine the deviation is used as a threshold value for detecting a defective description of the correlation, wherein, as an absolute value, in the case of power values, for example, the values 10 W or 50 W or 100 W, or in the case of currents, for example, 10 A or 50 A or 100 A, or in the case of voltages, for example, 10 V or 50 V or 100 V can be used.

In addition to the advantages already mentioned, it can also be achieved by the present invention that a model of a feed network determined according to the invention can also automatically supply information about optionally present consumers. Particularly in cases in which the electrical feed network comprises at least one unknown electrical consumer which causes at least one electrical consumption variable in the electrical supply network, the at least one electrical consumer and the consumption variable brought about by it can be mapped in the model of the feed network and are thus taken into account when determining the at least one target value for the at least one electrical feed variable and during the adaptation of the model of the feed network.

In order to carry out a model adaptation and thus a correction of the model in the event of an erroneous description of the feed network by the model even before carrying out the proposed method steps for the generation of target values and for regulation, a model adaptation can also be carried out particularly advantageously before the two proposed method steps for the generation of target values and regulation.

Advantageously, all method steps and thus also the presented model adaptation are carried out during operation of the feed network, which in particular avoids operating interruptions and associated impairments and accordingly represents a particularly advantageous embodiment of the method according to the invention.

Figure 2:
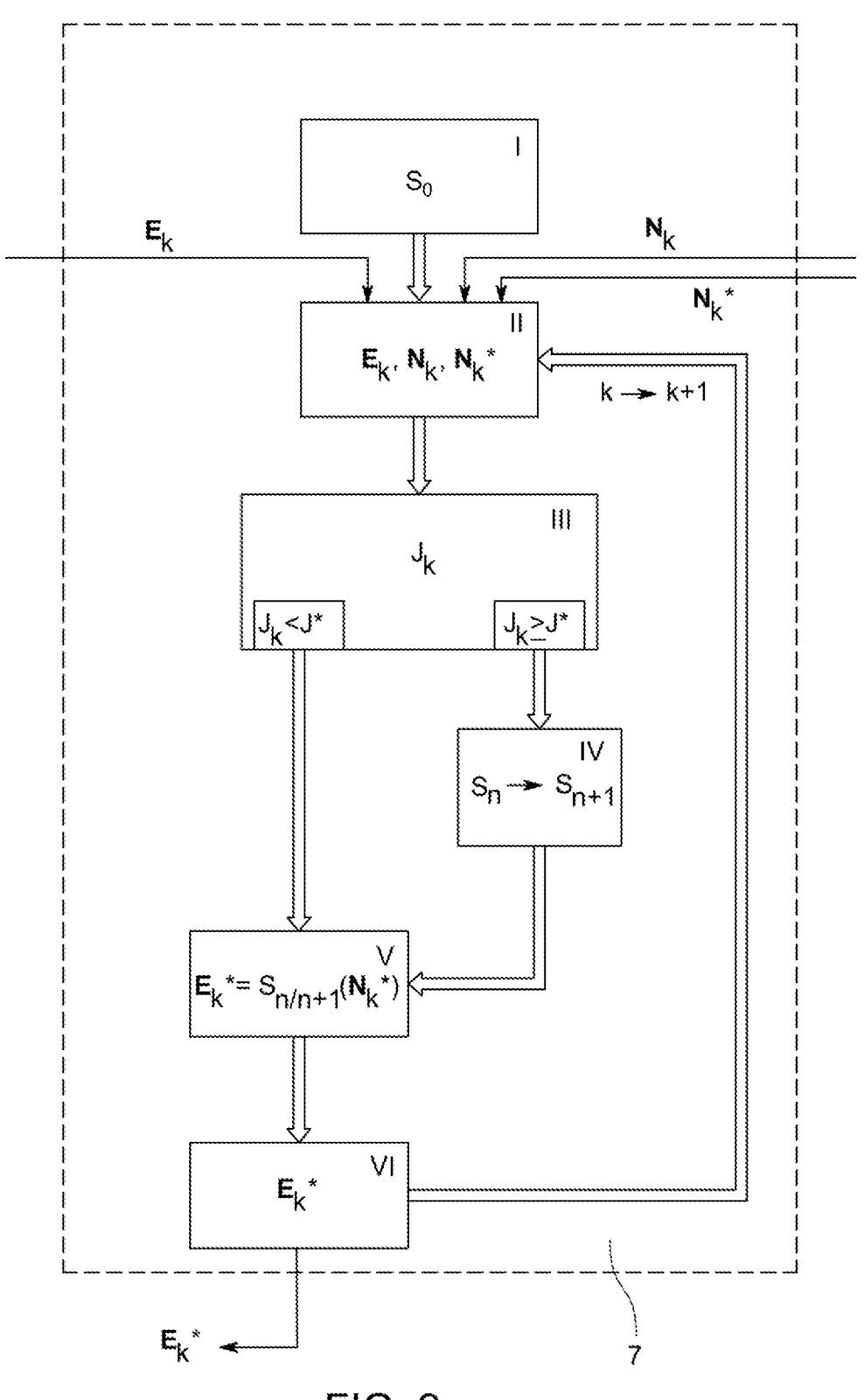
Figure 3:
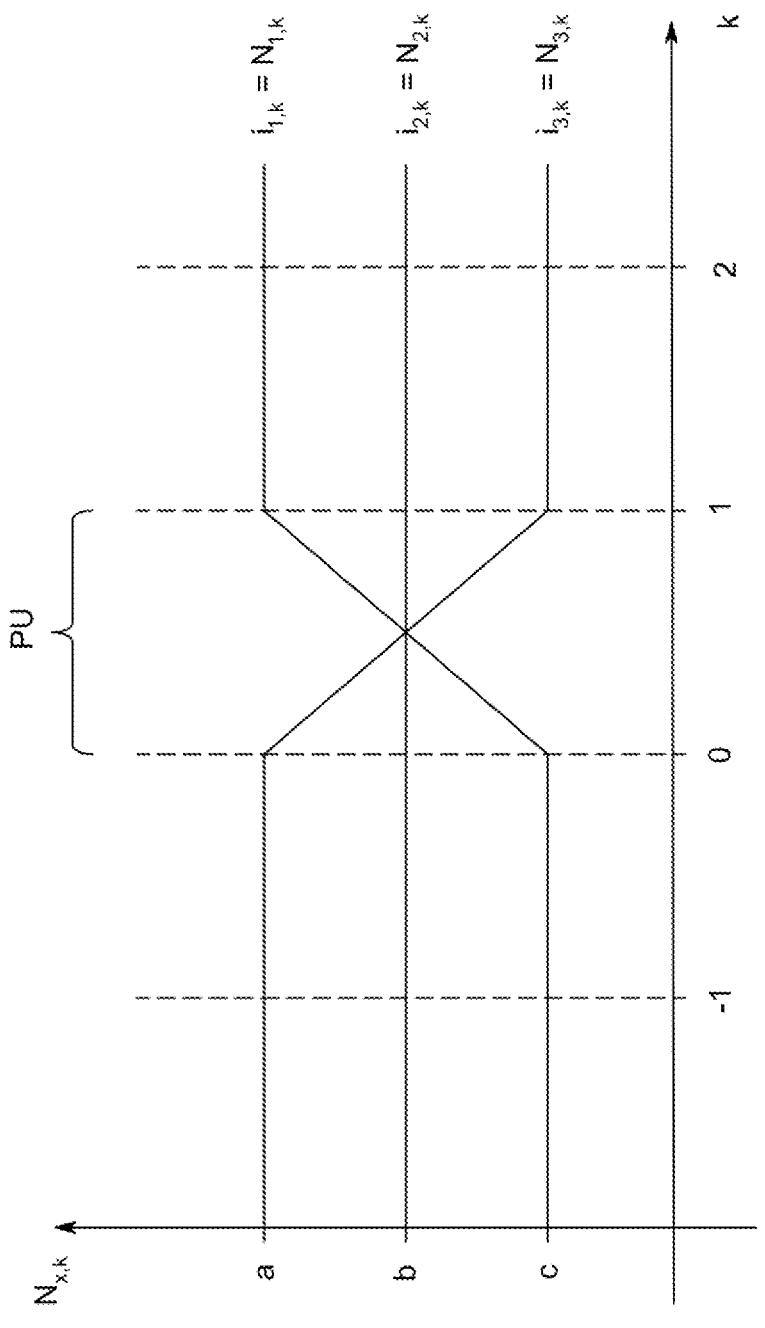

The present invention is described in greater detail below with reference to FIGS. 1 through 3, which show schematic and non-limiting advantageous embodiments of the invention by way of example. In the figures:

FIG. 1 shows a three-phase feed network with power converter, measuring device and optional consumers FIG. 2 shows a flowchart of the method according to the invention FIG. 3 shows a current profile in case of phase inversion.

FIG. 1 initially shows a feed network 4, a power converter 1 and a measuring device 3. The consumers 5, 6 further shown in FIG. 1 should be considered optional and do not represent a mandatory prerequisite for the application of the method according to the invention. The power converter 1 is preferably provided by an inverter, as mentioned at the outset, however, a converter is also possible in the present context. FIG. 1 also shows a network connection point 2 via which the feed network 4 can be connected to a distribution network 10 and which is electrically equivalent to the connection point of the measuring device 3, a converter connection point 8 in order to connect a power converter 1 to the feed network 4, and a control unit 7. As mentioned at the outset, different electrical operating means can be provided in the feed network 4, as indicated by the dashed-dotted box in the interior of the feed network 4, such as a transformer or a phase inverter which can be unknown in particular at the beginning of the operation of the feed network 4 and/or can change during operation. For a better distinction between the feed network 4 and the distribution network 10, in FIG. 1, the phases of the feed network 4 are indicated as $L_1$, $L_2$, $L_3$ and those of the distribution network 10 to which the feed network 4 is connected as $L_1^*$, $L_2^*$, $L_3^*$. The representation of the exemplary feed network 4 in FIG. 1 on the basis of three phases is based on the frequently customary implementation of AC-systems as three-phase systems. Although the use of the method according to the invention in three-phase AC-systems represents a preferred application, the method according to the invention is in no way limited thereto. The method according to the invention can be used equally from single-phase systems up to multiphase networks capable of unbalanced loads.

Furthermore, FIG. 1 shows at the power converter connection point 8 per phase a feed variable $E_x$, a network variable at the network connection point 2 per phase $N_x$ and a consumption variable between the feed network 4 and the measuring device 3 in the branches to the optional consumers 6 per phase $V_x$. The running variable x here represents the index of the phases $L_1$, $L_2$, $L_3$. Within the scope of the following designs, at a plurality of locations for a comprehensive view of a plurality of feeding, network and consumption variables, the vector-valued variables E, N and V are used, which are noted in bold to distinguish them from the scalar values $E_x$, $N_x$ and $V_x$. If, for example, as feed variables, for example, the phase currents prevailing at the power converter connection point 8 $i_{Ex}$ are considered, in this sense $$E = \begin{pmatrix} E_1 \\ E_2 \\ E_3 \end{pmatrix} = \begin{pmatrix} i_{E1} \\ i_{E2} \\ i_{E3} \end{pmatrix}.$$

In the course of the following statements, an assignment of the mentioned variables E, N and V to discrete points in time is advantageous, whereby the discrete time index k is subsequently used. As is customary in digital technology, the time index k can in this case preferably describe points in time $t_k$ equidistant from one another, which, as is well known, can be obtained from a starting point in time $t_0$ and a discrete sampling time $T_a$ by the specification $t_k = t_0 + k \cdot T_a$. In this sense, the vector $$E_k = \begin{pmatrix} E_{1,k} \\ E_{2,k} \\ E_{3,k} \end{pmatrix} = \begin{pmatrix} i_{E1,k} \\ i_{E2,k} \\ i_{E3,k} \end{pmatrix}$$

would combine the phase currents $i_{E1,k}$, $i_{E2,k}$ and $i_{E3,k}$ prevailing at the power converter connection point 8 at a point in time $t_k$. In this regard, it should be noted that the subsequent time-discrete observation can only be seen as an example, and that time-continuous variables could also be used to describe the method according to the invention. The target values for network variables $N_{x,k}$ and feed variables $E_{x,k}$ that are substantial for the method according to the invention are indicated in the following by $N_{x,k}^*$ or $E_{x,k}^*$, for vectors accordingly the notation $E_k^*$ or $N_k^*$ is used. Network variable target values $N_{x,k}^*$ are in many cases predefined externally, which is shown in FIG. 1 by the signal path entering from above into the control unit 7, which transfers a vector of network variable target values $N_k^*$ to the control unit 7, for example, in order to fulfill feed guidelines to be fulfilled. As likewise shown in FIG. 1, the control unit 7 is used to read measured values of the network variables $N_{x,k}$ and the feed variable $E_{x,k}$ via a bus system 9. Since a plurality of measured network variables $N_{x,k}$ and feed variables $E_{x,k}$ are read in, the signals read in by the control unit 7 are vectors noted in bold. In the embodiment shown in FIG. 1, the control unit also outputs a vector of feed variable target values $E_k^*$.

In this context, it should be mentioned that at least one network variable $N_{x,k}$ and at least one feed variable $E_{x,k}$ are required as measured variables to carry out the method according to the invention. However, using only one network variable $N_{x,k}$ and only one feed variable $E_{x,k}$ represents a minimal implementation. In an advantageous manner, for each phase of the feed network 4 at the power converter connection point 8, a feed variable $E_{x,k}$ is measured and for each phase of the feed network 4 at the network connection point 2, a network variable $N_{x,k}$ is measured. With regards to vector notation, however, it should be noted that the used vector-valued variables $E_k$, $N_k$ and $V_k$ can also only contain one element, and thus also the case in which only one feed variable $E_{x,k}$, network variable $N_{x,k}$ and consumption variable $V_{x,k}$ are used is included.

In the situation shown in FIG. 1, the power converter 1 is connected to an energy generating system 11, for example to a PV system or a fuel cell system, which initially supplies the power converter 1 with electrical DC variables. Since AC power networks are typically used in both feed networks 4 and distribution networks 10, it may be necessary to convert such DC variables before they are fed into alternating variables. A further important embodiment of an energy generating system 11 is provided by so-called uninterruptible power supplies, with the aid of which, in the event of failures of a distribution system 10, a local electrical network of a stationary electrical accumulator (battery, hydrogen fuel cell, etc.) can usually initially be supplied with DC variables. In many applications, in addition to a first converter 1, further power converters can also be connected to the feed network 4. The applicability of the method according to the invention is thereby not limited, if necessary a feed variable $E_{x,k}$ represents in this case, however, a sum of multiple feed variables of a plurality of individual converters 1, which can be represented as a function of the number $n_E$ of power converters 1 as $$E_{x,k} = \sum_{j=1}^{n_E} E_{x,k,j}$$

In the context of the present application, it also applies to a power converter 1 that it can be designed variably regarding the number of phases it supplies. Thus, the method according to the invention can also be used in situations in which single-phase, two-phase, three-phase or even multiphase converters are provided or combined.

The optional and usually unknown consumers 5, 6 shown in FIG. 1 can comprise a wide variety of electrical appliances and/or devices, depending on the specific application. In the case of a PV system that supplies a household with electrical energy and can also feed into a distribution network 10 via a feed network 4, the consumers 5 and 6 can represent everyday electrical appliances such as microwaves, washing machines or even refrigerators. If a feed network 4, as shown in FIG. 1, is part of an industrial complex, devices with a high energy requirement, such as machine tools or entire manufacturing lines, are also conceivable instead of or in addition to the mentioned everyday devices. The method according to the invention can be used in this context regardless of the specific design of the unknown consumers 5, 6. The optional consumers 5, 6 could also be generators that do not absorb electrical energy from the feed network 4, but output electrical energy to the feed network 4.

In an advantageous design, the assumption is made as a basis of the method according to the invention regarding the position of the optional consumers 5, 6 that all consumers 5, 6 are connected either at the output of the feed network 4, such as the consumer 6, or at the input of the feed network 4, such as the consumer 5. For the application of the present invention, it is irrelevant whether the consumers 5, 6 are related to the input or the output of the feed network 4. If all consumers are related to the input of the feed network 4, reference is made to consumers 5, 6 in the "power converter system." if related to the output of the feed network 4 reference is made to consumers 5, 6 in the "counter system." This step has the consequence that the consumption variables $V_{x,k}$ are also calculated as based on one side, which represents a great simplification for the implementation of the method. For the aim of the method according to the invention, i.e. correctly regulating network variables output to a distribution network 10 $N_{x,k}$, whether the consumption variables taken into account $V_{x,k}$ are represented in a corresponding converter or counter system is irrelevant. Furthermore, since in many cases the mere number of optionally connected consumers 5, 6 is unknown, it is also often advantageous to represent all consumers 5, 6 assumed on only one side of the feed network 4 with only one individual, cumulative consumer 6. The effect of potentially many consumers on a feed network 4 can thus be indicated by concentrated consumption variables $V_{x,k}$ for which analogously to the consideration of a plurality of power converters 1

$$V_{x,k} = \sum_{j=1}^{n_V} V_{x,k,j}$$

can be considered, wherein $n_V$ stands for the number of consumers.

It also holds in the case of the feed network 4 shown in FIG. 1 that its specific design and topology can strongly depend on the specific application. For the method according to the invention, transformers, converters and phase inverters in particular represent typical electrical operating means which can be provided in the feed network 4. If, according to the present invention, the power converter 1 has to control at the power converter connection point 8 the feed variables prevailing there, $E_{x,k}$ in such a way that the network variables prevailing there at the network connection point 2 $N_{x,k}$ assume specific network variable target values $N_{x,k}^*$, changes of the feed network 4, for example in the form of a change in a transformer transformation ratio or a change in the phase assignment between the power converter connection point 8 and the network connection point 2, are taken into account according to the invention by adapting a preferably mathematical model of the feed network 4.

For such a model of a feed network 4, an algebraic representation can already be sufficient in many cases, which $A_n$ can be specified for example in the form of a linear equation system as $$A_n \cdot E_k + V_k = N_k$$

describing the correlation between the vector of feed variables $E_k$ and the vector of network variables $N_k$. The optional consumers $V_k$ are here assumed in a counter system. If no consumers 5, 6 are present, this can be easily considered by the assignment of $V_k = 0$ with a zero vector 0 of suitable dimension.

The model index n in the matrix also referred to below as model matrix $A_n$ expresses the fact that a model of a feed network 4 and thus in the present case the model matrix $A_n$ can change. However, since according to the invention an adaptation and thus a change of a model in the form of a model matrix $A_n$ does not occur at any point in time k, the time index k and model index n are generally different. The conversion of a vector of network variable target values $N_k^*$ provided within the scope of the present invention to a vector of feed variable target values $E_k^*$ can be determined using this model through the mapping $$E_k^* = A_n^{-1}(N_k^* - V_k)$$

The vector of the feed variables $E_k$ can subsequently preferably be set or controlled with the aid of the power converter 1 on this vector of feed variable target values $E_k^*$, for which reason a wide variety of methods of regulating and/or control technology can be used. In the case of a transformer located in the feed network 4, the model matrix $A_n$ can assume the form $$A_n = \begin{pmatrix} z & 0 & 0 \\ 0 & z & 0 \\ 0 & 0 & z \end{pmatrix}$$

with which by means of the transformer transmission ratio located on the main diagonal of the matrix z, for example, a conversion of phase currents from the side of the power converter 1 to the side of the measuring device 3 can be carried out. A converter could also be mapped in this way. In the case of a phase inverter located in a three-phase feed network 4, an algebraic mapping by the matrix $$A_n = \begin{pmatrix} 0 & 1 & 0 \\ 1 & 0 & 0 \\ 0 & 0 & 1 \end{pmatrix}$$

can be provided, with which in the specific case an exchange of the phases $L_1$ and $L_2$ can be performed.

If, for a model of the feed network 4, in the form shown above, an erroneous description of the correlation between the feed variable vector $E_k$ and network variable vector $N_k$ is recognized, the model of the feed network 4 is adapted. In the case of the present model matrix $A_n$, this can mean the assignment of new values to the elements of the model matrix $A_n$. A plurality of methods can be used for this step. In an advantageous manner, the present model of the feed network 4 can initially be described, to this end, in so-called homogeneous coordinates $$\underbrace{\begin{pmatrix} A_n & V_k \\ 0_E & 1 \end{pmatrix}}_{H_k} \underbrace{\begin{bmatrix} E_k \\ 1 \end{bmatrix}}_{X_k} = \underbrace{\begin{bmatrix} N_k \\ 1 \end{bmatrix}}_{Y_k}$$

Therein, the vector $0_E$ represents a zero vector, whose length corresponds to the column number of the matrix $A_n$. The matrix-valued or vector-valued variables $H_k$, $X_k$, $Y_k$ in this case serve for a more compact notation of the present model. An adaptation or also a new identification of the model of the feed network 4 can in the given case be implemented by determining a suitable matrix $H_k$. In this embodiment, it is particularly advantageous that when the matrix $H_k$ is identified next to the matrix $A_n$ automatically, the optional consumers $V_k$ provided at a point in time $t_k$ are also identified. Using the measurement data of the feed variables $E_k$ and the network variables $N_k$, in the sense of a least-squares approach (LS approach), the matrix $H_k$ can be determined, for example, by searching for an optimal value $H_k$ which minimizes the cost function $$J_k = \|Y_k - H_k X_k\|_2^2 = (Y_k - H_k X_k)^T (Y_k - H_k X_k)$$

wherein the operator $$\|\cdot\|_2^2$$

corresponds to the well-known 2 standard. The first derivative of the cost function $J_k$ is preferably set to zero after the matrix $H_k$ and the resulting expression is resolved on the matrix $H_k$. This procedure initially leads to $$\frac{d}{(dH_k)J_k} = \frac{d}{dH_k}\|Y_k - H_k X_k\|_2^2 = -2Y_k X_k^T + 2H_k(X_k X_k^T) \overset{!}{=} 0,$$

from which within the meaning of the present 2-standard standard an optimal estimated value $\hat{H}_k$ in the form of $$\hat{H}_k = Y_k X_k^T (X_k X_k^T)^{-1}$$

can be determined. As is known from the technical literature, the matrix $\widehat{A_{n_k}}$ contained in the matrix $\hat{H}_k$ must not necessarily be incorporated directly in a new model matrix $A_{n+1}$ and a given matrix $A_n$ accordingly completely overwritten with $\widehat{A_{n_k}}$. Rather, a model matrix $A_n$ can also be changed stepwise, for example by only adding a proportion of a result according to the calculation shown above to the current $A_n$, which, among other things, can be implemented in the form of $$A_{n+1} = (1 - \mu) \cdot A_n + \mu \cdot \hat{A}_{n_k}$$

with the weight factor $\mu$ between zero and one. Such approaches are known in the relevant literature in particular as so-called least-squares or minimum-mean square-error estimators ("LS algorithms", "MMSE estimator").

This approach also directly provides a possibility, to recognize during operation without additional effort, whether an erroneous description of the correlation between the feed variables $E_k$ and the network variable $N_k$ is provided by the model of the feed network 4 and whether an adaptation of the model is accordingly required. Thus, among other things, the value of the present cost function $J_k$ can be calculated during operation, for example at points in time $t_k$ described by the discrete time index k while carrying out the method according to the invention. However, the cost function $J_k$ can also be calculated only at a portion of the points in time occurring during the carrying out of the method according to the invention. If it is recognized that the cost function $J_k$ exceeds a predeterminable threshold J*, an adaptation according to the proposed approach can be carried out.

A further embodiment of the approach shown results from an interesting Interpretation of the cost function $J_k = \|Y_k - H_k X_k\|_2^2$. If the expression $A_n \cdot E_k + V_k$ is considered, in the event that for $E_k$ the measured variables available at point in time $t_k$ for the feed variables $E_k$ and for $V_k$ the estimated values available at point in time $t_k$ of the possibly present consumption variables are used as estimated value $\tilde{N}_k = A_n \cdot E_k + V_k$ for the network variables given $N_k$ at the output of the feed network 4, the cost function can also be viewed as the deviation between the actually measured values $N_k$ of the network variables and estimated values determined as described $\tilde{N}_k$, i.e $$J_k = \left\| \begin{bmatrix} N_k \\ 1 \end{bmatrix} - \begin{bmatrix} \tilde{N}_k \\ 1 \end{bmatrix} \right\|_2^2.$$

Conversely, in this sense, starting from the measured network variables, $N_k$ also estimates $\tilde{E}_k$ for the feed variables $E_k$ can be determined, preferably based on the inverses of the model matrix $A_n$ as in the calculation of feed variable target values from target values in the form of $\tilde{E}_k = A_n^{-1}(N_k - V_k)$. A further cost function can directly be indicated in the form of $$J_k = \left\| \begin{bmatrix} E_k \\ 1 \end{bmatrix} - \begin{bmatrix} \tilde{E}_k \\ 1 \end{bmatrix} \right\|_2^2,$$

which compares the estimated values of the feed variables $\tilde{E}_k$ determined using the model with actual measured values of the feed variables $E_k$. If as before, the resulting deviation between estimates and measured values, and thus the value of the cost function $J_k$ greater than a predeterminable threshold Y* an adaptation of the model can be carried out. An erroneous description of the correlation between feed variables $E_k$ and network variables $N_k$ can accordingly be detected, for example, by considering the deviation of measured network variables $N_k$ or feed variables $E_k$ to estimated network variables $\tilde{N}_k$ or feed variables $\tilde{E}_k$.

In addition to a purely algebraic mapping, the model of the feed network 4 can also comprise dynamic elements which can be described, for example, by a system of common differential equations and can allow the consideration of possibly present energy stores, such as coils or capacitors. In such cases, the dynamic portion of a model can also be taken into account in a new identification according to the invention. In these cases, the specific implementation of the identification process depends on the specific design of the model.

For a plurality of identification methods, a sufficient quantity or number of measured values ("persistence of excitation") of known inputs and outputs of the system to be identified or, in the case of unknown inputs and outputs, sufficient statistical information of these are required.

As for the other network components shown in FIG. 1, for the measuring device 3, it also applies that several embodiments are conceivable for the implementation thereof, for example a so-called intelligent counter ("smart meter"). Irrespective of the specific design of the measuring device 3, it is substantial for the method according to the invention that the measured values of the network variables $N_{x,k}$ detected by the measuring device 3 are accessible by a control unit 7, on which the method steps according to the invention are carried out. The same applies to measurements of the feed variables prevailing at the power converter connection point 8 $E_{x,k}$ the measurement of which in a preferred embodiment takes place directly by the power converter 1 itself. If the power converter 1 does not allow a direct measurement of the feed variables $E_{x,k}$ a suitable further measuring device can also be provided at the power converter connection point 8. A computational derivation of the feed variables $E_{x,k}$ from other known measured variables is also conceivable.

The detected measured values are preferably provided to the control unit 7 by a suitable data communication connection, for example by data transmission by means of a bus system 9, which connects at least the power converter 1, the measuring system 3 and the control unit 7 to one another. A bus system 9 is understood to mean a system for data transmission between a plurality of subscribers via a common transmission path, wherein in the specific implementation many standards known in the prior art can be used. A number of possible designs, such as Profibus, Profinet, or EtherCAT, exist in particular for fieldbus systems which are particularly suitable for the present purpose. A wireless data communication connection for data transmission, for example via a mobile radio standard, is also conceivable.

According to the design shown in FIG. 1, the control unit 7 is a substantial component in the implementation of the method according to the invention. In this case, the control unit 7 represents hardware or can be integrated into existing hardware which enables programs to be executed for a purpose resulting from the method according to the invention. Possible implementations of such units are, among other things, microprocessor-based hardware, microcontrollers and integrated circuits (ASIC, FPGA).

However, a practical implementation of the method according to the invention can also take place in a distributed manner, wherein a plurality of control units 7 are connected to one another. In the specific example of the feed network 4 shown in FIG. 1, it is also conceivable to divide the method steps according to the invention into a power converter 1, a measuring unit 3 and the control unit 7. In a further possible embodiment, the control unit 7 can also be part of the power converter 1 or of the measuring device 3. If the method steps according to the invention are divided into, for example, a power converter 1 and a control unit 7 external from the power converter 1, the vector of the feed variable target values $E_k^*$ to be set by the power converter 1 can be determined by the control unit 7 and transmitted to the power converter. In an advantageous embodiment, however, an optionally adapted model of the feed network and a vector of network variable target values $N_k^*$ can also be supplied by the control unit 7 to the power converter 1 and the calculation of the vector of feed variable target values $E_k^*$ can be carried out only in the power converter 1.

A possible implementation of the method steps according to the invention in the control unit 7 is shown in FIG. 2 in the form of a flowchart. The model of the feed network 4 is thereby defined by S and can contain, as already explained, a transformation matrix A or also a dynamic model in the form of a differential equation system.

In step I of the flowchart, at the beginning of the method, i.e for time index k=0 the model of the feed network 4 is initialized with an initialization model $S_0$. For this purpose, for example, existing pre-knowledge about the feed network 4 can be used, which, however, is not necessary for a successful application of the method according to the invention. In the case of a model description by a transformation matrix, said transformation matrix can, for example, be selected as $$A_0 = \begin{pmatrix} 1 & 0 & 0 \\ 0 & 1 & 0 \\ 0 & 0 & 1 \end{pmatrix}$$

i.e., equal to a suitably dimensioned unit matrix. "Matching dimensions" is to be understood in the present context as a dimensioning of the matrix $A_0$ in which the row and column numbers correspond to the number of phases of the feed network 4. In particular, a matrix vector multiplication of the matrix $A_0$ is thereby possible with the feed variable vector $E_k$. Such initialization is also referred to below as "initialization with a neutral element." In addition to a neutral element, the model of the feed network 4 can also be initialized with a model known already a priori, i.e. before the start of the method. In this regard, in particular, the possibility of predetermining an already known phase assignment by means of a matrix $A_0$ or a known transformer transformation ratio by means of a matrix $A_0$ is to be noted. If consumers are present, prior knowledge about the approximate consumption can also be used for initialization. For example, at the start of the method, when there is usually no feed yet and therefore $E_0=0$ applies, from the measured values of the network variables No, one can infer the initial consumers $V_0$, which in these cases usually correspond to the consumption variables $V_0$.

In step II of the flowchart, the current measured values at given point in time $t_k$ of the present feed variables $E_k$ and network variables $N_k$, which are recorded in vector form, and the specified targets $N_k^*$ are read. The network variable target values $N_k^*$ are read in, for example, from a data interface, a control line, a calculation unit, a data memory with stored fixed value, etc. It should be noted at this point that the specific points in time at which the measured values of the feed variables $E_k$ are effectively detected in the power converter 1 and the measured values of the network variables $N_k$ are effectively detected in the measuring device 3 can actually deviate from one another. Possible reasons for this are different sampling rates of the power converter 1 and the measuring device 3 or asynchronous operation of the power converter 1 and the measuring device 3. The implementation of the method according to the invention does not represent any limitation.

In step III of the flowchart, the valid value of the cost function $J_k$ at the point in time $t_k$ is determined. For this purpose, the procedure presented above can be used, or other approaches can be used.

If the determination of $J_k$ provides a value below the predefined threshold J*, step V proceeds, with the calculation according to the invention of feed variable target values $E_k^*$ as a function of the model $S_n$, from the network variable target values $N_k^*$ read in step II.

If the determined value of $J_k$ is, on the other hand, above the threshold J*, in step IV, still before step V of the flowchart, an adaptation or new identification of the model $S_n$ is carried out. This adaptation of the model is represented based on the change in the index $S_n$, to $S_{n+1}$. The model index n at this point is clearly to be distinguished from the time index k since a model adaptation is usually not carried out at any point in time k.

Since the described determination of the feed variable target values $E_k^*$ in step V depends on the specific form of the model $S_n$, and this may have changed in step IV, the possibility of changing the model $S_n$ is shown by means of the representation of the two possible indices n and n+1.

Step VI of the flowchart provides the implementation of the previously determined feed variable target values $E_k^*$, i.e., setting or controlling physical feed variables $E_k$ to the determined feed variables $E_k^*$. If this step takes place in a power converter 1, as explained above with reference to FIG. 1, it may be necessary to transmit the determined feed variables $E_k^*$ from the control unit 7 to the power converter 1, which is indicated in FIG. 2 by the signal arrow conducted out of the control unit under block VI.

Subsequently, i.e. at the following point in time $t_{k+1}$ the next loop run is started with step II of the flowchart.

As can be seen from the preceding statements, the determination of when and whether an erroneous description of the correlation between the at least one feed variable $E_{x,k}$ and the at least one network variable $N_{x,k}$ is provided by the model of the feed network 4 and whether an adaptation of the model of the feed network 4 should accordingly be carried out, plays a decisive role. In addition to the above-described monitoring of the 2-standard based cost function $J_k$, a further possibility in this regard is shown below.

Specifically, a comparison of measured values of the network variables $N_k$ and the feed variables $E_k$ with measured values of the network variables $N_{k\_}d$ and the feed variables $E_{k\_}d$ from a preceding point in time $t_{k\_}d$ is used. In order to transmit this consideration to a numerically detectable cost function, the approach for example, of $J_k=|E_k-E_{k-d}|^2+|N_k-N_{k-d}|^2$ can be made, whereby, as before, a comparison with a predefined threshold $Y^*$ can be carried out. Preferably, the measured values available at the immediately preceding point in time $k-1$ are used here; i.e., $d=1$ is selected. The basic idea behind this approach is that abrupt/stepwise/significant changes in network variables $N_k$ and/or feed variables $E_k$ can be considered as an indication for a change in the feed network 4. If the feed network 4 to be modeled has changed accordingly, it may be necessary to adapt the model of the feed network 4 thereto.

In many cases, it is advantageous in this context to average the values of a cost function $J_k$ before comparison with a threshold $Y^*$ or to subject them to a low-pass filtering, in order to reduce, for example, the influence of a measurement noise that is always given in practice.

The idea behind the observation of abrupt/sudden/significant changes in network variables $N_k$ and/or feed variables $E_k$ between two time steps are shown in more detail in FIG. 3 on the basis of a possible profile of three phase currents. The currents $i_{1,k}$, $i_{2,k}$ and $i_{3,k}$ in this case, for example, represent network variables $N_{1,k}$, $N_{2,k}$ and $N_{3,k}$ in the phases of a three-phase feed network 4. The effect of a phase switching PU between the time indices $k=0$ and $k=1$, for example, on the cost function $J_k=|N_k-N_{k-1}|^2$ can be read directly. For time index $k=0$ with the values a, b and c for the network variables $N_{1,k}$, $N_{2,k}$ and $N_{3,k}$ the resulting cost function is $$J_0 = (i_{1,0} - i_{1,-1})^2 + (i_{2,0} - i_{2,-1})^2 + (i_{3,0} - i_{3,-1})^2$$
$$= (c - c)^2 + (b - b)^2 + (a - a)^2 = 0$$

However, at time index $k=1$, based on the phase switching PU, the conditions change fundamentally, which in terms of cost function leads to $$J_1 = (i_{1,1} - i_{1,0})^2 + (i_{2,1} - i_{2,0})^2 + (i_{3,1} - i_{3,0})^2$$
$$= (a - c)^2 + (b - b)^2 + (c - a)^2 = 2(a - c)^2$$

In an advantageous embodiment of the method according to the invention, the threshold value $J^*$ can also be adapted during operation. The predefined threshold value can thus, for example, amount to 10%, 50% or even 100% of at least one measured value of a feed variable $E_{x,k}$ taken into account for determining the cost function or of a network variable $N_{x,k}$. In this case, the threshold value is thus a relative value. If, for example, the network variable is, however, a zero feed, an absolute value can be used as the threshold value, for example 100 W or 0.55 A.

In a further preferred embodiment of the method according to the invention, the cost function $J_k$ is not compared with a fixed threshold value $Y^*$, but its percentage change is considered. Thus, in a preferred embodiment, a new identification of the model of the feed network 4 can always be carried out if the value of the cost function $J_k$ changes in comparison to the preceding time step by at least 10%, preferably 50% and most preferably 100%.

The invention claimed is:

1. A method for controlling electrical network variables at a network connection point at an output of a feed network which, at an input of the feed network, is connected to at least one power converter at a power converter connection point, wherein at the power converter connection point at least one feed variable and at the network connection point at least one network variable are measured and wherein a correlation between the at least one feed variable and the at least one network variable is described by a model of the feed network, wherein the model of the feed network is implemented in a control unit of the feed network, the method comprising:

in an event of a deviation of the measured at least one network variable from a network variable to be expected based on the model of the feed network and/or a deviation of the measured at least one feed variable from a feed variable to be expected based on the model of the feed network:

detecting an erroneous description of the correlation by the control unit, and carrying out an adaptation of the model of the feed network by the control unit in order to correct the erroneous description of the correlation by the model of the feed network, wherein at least a portion of detected measurement data of the at least one feed variable and at least a portion of detected measurement data of the at least one network variable, are used, wherein the control unit determines, by the model of the feed network from a predefined network variable target value for the at least one network variable a feed variable target value for the at least one feed variable, and wherein the at least one feed variable is set using the at least one power converter to the determined feed variable target value.

2. The method according to claim 1, wherein a deviation of the measured at least one network variable from a network variable to be expected based on the model of the feed network and thus an erroneous description of the correlation is detected and an adaptation of the model of the feed network is carried out if the deviation between a measured value of the at least one network variable and an estimated value of the at least one network variable calculated by the model of the feed network exceeds a predefined threshold value.

3. The method according to claim 2, wherein, as a predefined threshold value, a relative value of a measured value used to determine the deviation of the at least one feed variable or the at least one network variable is used.

4. The method according to claim 2, wherein, as a predefined threshold value, an absolute value of a measured value used to determine the deviation of the at least one feed variable or of the at least one network variable is used.

5. The method according to claim 1, wherein a deviation of the measured at least one feed variable from a feed variable to be expected based on the model of the feed network and thus an erroneous description of the correlation is detected and an adaptation of the model of the feed network is carried out if the deviation between a measured value of the at least one feed variable and an estimated value of the at least one feed variable calculated by the model of the feed network exceeds a predefined threshold value.

6. The method according to claim 1, wherein a deviation of the measured at least one network variable from a network variable to be expected based on the model of the feed network and/or a deviation of the measured at least one feed variable from a feed variable to be expected based on the model of the feed network and thus an erroneous description of the correlation are detected and an adaptation of the model of the feed network is carried out if the deviation between two measured values of the at least one network variable or the deviation between two measured values of the at least one feed variable from two different points in time exceeds a predefined threshold value.

7. The method according to claim 1, wherein the electrical feed network comprises at least one unknown electrical consumer, which causes at least one electrical consumption variable in the electrical feed network and wherein the at least one unknown electrical consumer and the consumption variable caused by the at least one unknown electrical consumer are modeled in the model of the feed network and considered in determining the at least one target value for the at least one electrical feed variable and in the adaptation of the model of the feed network.

8. The method according to claim 1, wherein both the determination of the feed variable target value for the at least one feed variable and the adaptation of the model of the feed network are carried out during operation of the feed network.

9. The method according to claim 1, wherein the at least one feed variable and/or the at least one network variable are provided by electrical power variables, such as electrical current, electrical voltage, or electrical power.

10. The method according to claim 1, wherein by controlling to the target value determined during operation for the at least one feed variable, the at least one network variable is also set to a specified target value.

11. The method according to claim 1, wherein the model of the feed network is initialized at the beginning of the method with a model known a priori or with a neutral element.

12. An arrangement for controlling electrical network variables at a network connection point at an output of a feed network, which is connected to a power converter at an input of the feed network at a power converter connection point, wherein a first measuring device is provided which measures at least one network variable at the network connection point, and wherein a second measuring unit is provided, which measures at the power converter connection point at least one feed variable, the arrangement comprising a control unit in which a model of the feed network is implemented, the model describing a correlation between the at least one feed variable and the at least one network variable by a model of the feed network, wherein the control unit is designed to:

detect, in the event of a deviation of the measured at least one network variable from a network variable to be expected based on the model of the feed network and/or a deviation of the measured at least one feed variable from a feed variable to be expected based on the model of the feed network, an erroneous description of the correlation, and carry out an adaptation of the model of the feed network in order to correct the erroneous description of the correlation by the model of the feed network, wherein, for adapting the model of the feed network, at least a portion of detected measurement data of the at least one feed variable and at least a portion of detected measurement data of the at least one network variable are used, wherein the control unit is designed to determine, by the model of the feed network, from a predefined network variable target value for the at least one network variable, a feed variable target value for the at least one feed variable, and wherein the power converter is designed to set the at least one feed variable to the determined feed variable target value.

* * * * *